United States Patent
Johnson, Jr. et al.

(10) Patent No.: US 11,550,258 B1
(45) Date of Patent: Jan. 10, 2023

(54) REPLACEABLE UNIT FOR AN IMAGE FORMING DEVICE HAVING A RETRACTABLE ENCODED MEMBER

(71) Applicant: LEXMARK INTERNATIONAL, INC., Lexington, KY (US)

(72) Inventors: Virgil Johnson, Jr., Versailles, KY (US); Daniel Lee Carter, Lexington, KY (US); Daniel George Mlejnek, Nicholasville, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 17/574,006

(22) Filed: Jan. 12, 2022

Related U.S. Application Data

(60) Provisional application No. 63/252,806, filed on Oct. 6, 2021.

(51) Int. Cl.
  *G03G 21/16* (2006.01)
  *G03G 21/18* (2006.01)
  *G06K 15/00* (2006.01)

(52) U.S. Cl.
  CPC ....... *G03G 21/1875* (2013.01); *G06K 15/407* (2013.01)

(58) Field of Classification Search
  CPC .................. G03G 21/1652; G03G 21/1875
  USPC .......................................... 399/107, 110, 111
  See application file for complete search history.

(56) References Cited

U.S. PATENT DOCUMENTS

| | | | |
|---|---|---|---|
| 8,210,530 B1 | 7/2012 | Gayne et al. | |
| 10,527,967 B1 | 1/2020 | Williamson et al. | |
| 10,527,969 B1 | 1/2020 | Williamson et al. | |
| 11,137,699 B1 | 10/2021 | Williamson | |
| 2017/0103791 A1 | 4/2017 | Booth et al. | |
| 2020/0218174 A1 | 7/2020 | Johnson, Jr. et al. | |
| 2020/0218175 A1 | 7/2020 | Johnson, Jr. et al. | |
| 2021/0317897 A1 | 10/2021 | Belarmino et al. | |
| 2021/0356002 A1 | 11/2021 | Belarmino et al. | |

FOREIGN PATENT DOCUMENTS

TW          390979       *   3/2000

OTHER PUBLICATIONS

U.S. Appl. No. 17/574,012, filed Jan. 12, 2022 (Johnson, Jr. et al.).

* cited by examiner

*Primary Examiner* — Hoan H Tran

(57) ABSTRACT

A replaceable unit includes a rotatable gear positioned on a housing of the replaceable unit and an encoded member encoded with identifying information of the replaceable unit. The encoded member is positioned on an axially outboard face of the gear such that the encoded member is rotatable with the gear for communicating the identifying information of the replaceable unit to a sensor of an image forming device when the replaceable unit is installed in the image forming device. The encoded member is configured to move axially outward relative to a rotational axis of the gear upon rotation of the gear in a first rotational direction for communicating the identifying information of the replaceable unit to the sensor. The encoded member is configured to move axially inward relative to the rotational axis of the gear upon rotation of the gear in a second rotational direction opposite the first rotational direction.

24 Claims, 11 Drawing Sheets

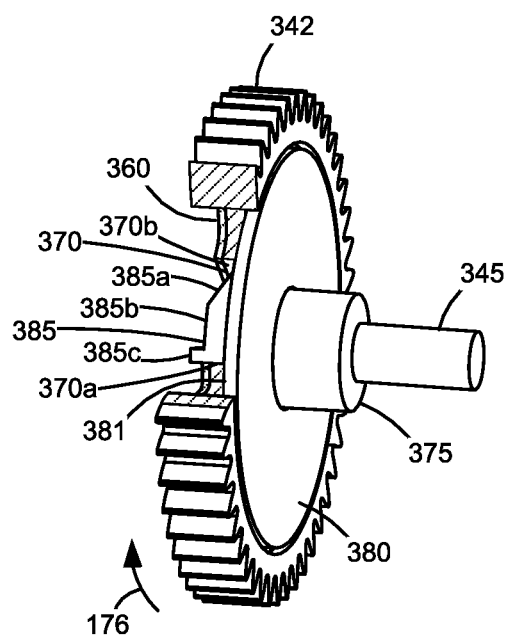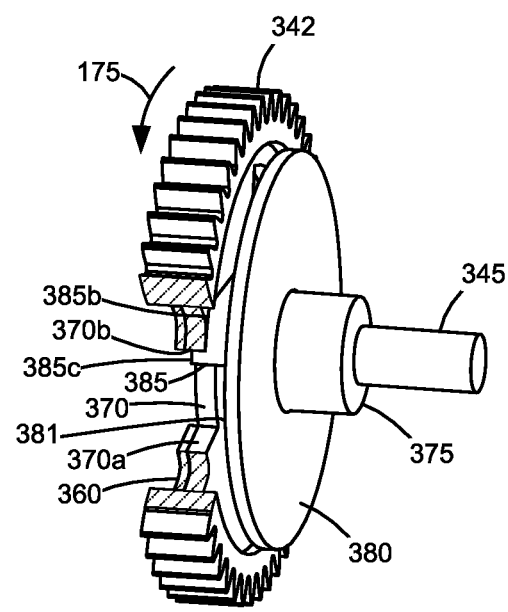
Figure 12A                              Figure 12B

REPLACEABLE UNIT FOR AN IMAGE FORMING DEVICE HAVING A RETRACTABLE ENCODED MEMBER

CROSS REFERENCES TO RELATED APPLICATIONS

This application claims priority to U.S. Provisional Patent Application Ser. No. 63/252,806, filed Oct. 6, 2021, entitled "Replaceable Unit for an Image Forming Device Having a Retractable Encoded Member," the content of which is hereby incorporated by reference in its entirety.

BACKGROUND

1. Field of the Disclosure

The present disclosure relates generally to image forming devices and more particularly to a replaceable unit for an image forming device having a retractable encoded member.

2. Description of the Related Art

In electrophotographic image forming devices, one or more replaceable toner containers may be used to supply toner for printing onto sheets of media. Each toner container often includes a toner agitator assembly that agitates and mixes toner stored in a toner reservoir to prevent the toner from clumping and that moves the toner to an outlet of the toner container. It is often desired for each toner container to communicate characteristics of the toner container to the image forming device for proper operation. For example, it may be desired to communicate such information as authentication or validation information, toner fill amount, toner color, toner type, etc.

SUMMARY

A replaceable unit for use in an electrophotographic image forming device according to one example embodiment includes a housing, a rotatable gear positioned on the housing of the replaceable unit, and an encoded member encoded with identifying information of the replaceable unit. The encoded member is positioned on an axially outboard face of the gear such that the encoded member is rotatable with the gear for communicating the identifying information of the replaceable unit to a sensor of the image forming device when the replaceable unit is installed in the image forming device. The encoded member is configured to move axially outward relative to a rotational axis of the gear upon rotation of the gear in a first rotational direction for communicating the identifying information of the replaceable unit to the sensor of the image forming device. The encoded member is configured to move axially inward relative to the rotational axis of the gear upon rotation of the gear in a second rotational direction opposite the first rotational direction.

Embodiments include those wherein the encoded member is configured to engage the sensor of the image forming device and rotate with the gear when the gear rotates in the first rotational direction for communicating the identifying information of the replaceable unit to the sensor of the image forming device. Embodiments also include those wherein the encoded member is configured to disengage from the sensor of the image forming device and rotate with the gear when the gear rotates in the second rotational direction.

In some embodiments, the replaceable unit includes a reservoir for storing toner and an outlet in fluid communication with the reservoir for exiting toner from the replaceable unit, wherein the replaceable unit is configured to move toner to the outlet when the gear rotates in the second rotational direction.

In some embodiments, the encoded member is spring-biased axially inward relative to the rotational axis of the gear.

Embodiments include those wherein the encoded member is configured to move axially outward away from the gear upon rotation of the gear in the first rotational direction, and the encoded member is configured to move axially inward toward the gear upon rotation of the gear in the second rotational direction. In some embodiments, the gear is configured to move axially outward upon rotation of the gear in the first rotational direction, and the gear is configured to move axially inward upon rotation of the gear in the second rotational direction.

A replaceable unit for use in an electrophotographic image forming device according to another example embodiment includes a housing, a rotatable gear positioned on the housing of the replaceable unit, and an encoded member encoded with identifying information of the replaceable unit. The encoded member is operatively connected to the gear such that rotation of the gear causes movement of the encoded member for communicating the identifying information of the replaceable unit to a sensor of the image forming device when the replaceable unit is installed in the image forming device. The encoded member is configured to move toward the sensor of the image forming device when the replaceable unit is installed in the image forming device upon rotation of the gear in a first rotational direction for communicating the identifying information of the replaceable unit to the sensor of the image forming device. The encoded member is configured to move away from the sensor of the image forming device when the replaceable unit is installed in the image forming device upon rotation of the gear in a second rotational direction opposite the first rotational direction.

A replaceable unit for use in an electrophotographic image forming device according to another example embodiment includes a housing, a rotatable gear positioned on the housing of the replaceable unit, and an encoded member encoded with identifying information of the replaceable unit. The encoded member is positioned on an axially outboard face of the gear such that the encoded member is rotatable with the gear for communicating the identifying information of the replaceable unit to a sensor of the image forming device when the replaceable unit is installed in the image forming device. The encoded member is movable relative to the gear along an axial direction of the gear between a retracted position and an extended position. Rotation of the gear in a first rotational direction causes the encoded member to move from the retracted position to the extended position. Rotation of the gear in a second rotational direction opposite the first rotational direction causes the encoded member to move from the extended position to the retracted position.

A replaceable unit for use in an electrophotographic image forming device according to another example embodiment includes a housing, a rotatable gear positioned on the housing of the replaceable unit, and an encoded member encoded with identifying information of the replaceable unit. The encoded member is positioned on an axially outboard face of the gear such that the encoded member is rotatable with the gear for communicating the identifying information of the replaceable unit to a sensor of the image forming device when the replaceable unit is installed in the image forming device. The gear is axially movable along a rotational axis of the gear relative to the housing. Rotation of the gear in a first rotational direction causes the gear to move axially outward to move the encoded member toward the sensor of the image forming device when the replaceable unit is installed in the image forming device for communicating the identifying information of the replaceable unit to the sensor of the image forming device. Rotation of the gear in a second rotational direction opposite the first rotational direction causes the gear to move axially inward to move the encoded member away from the sensor of the image forming device when the replaceable unit is installed in the image forming device.

In some embodiments, the encoded member is molded to the axially outboard face of the gear. In some embodiments, the encoded member and the gear are spring-biased axially inward away from the sensor of the image forming device.

BRIEF DESCRIPTION OF THE DRAWINGS

The accompanying drawings incorporated in and forming a part of the specification, illustrate several aspects of the present disclosure, and together with the description serve to explain the principles of the present disclosure.

FIGS. 12A and 12B are perspective views showing a retractable encoded member in a retracted position and in an extended position, respectively, according to another example embodiment.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
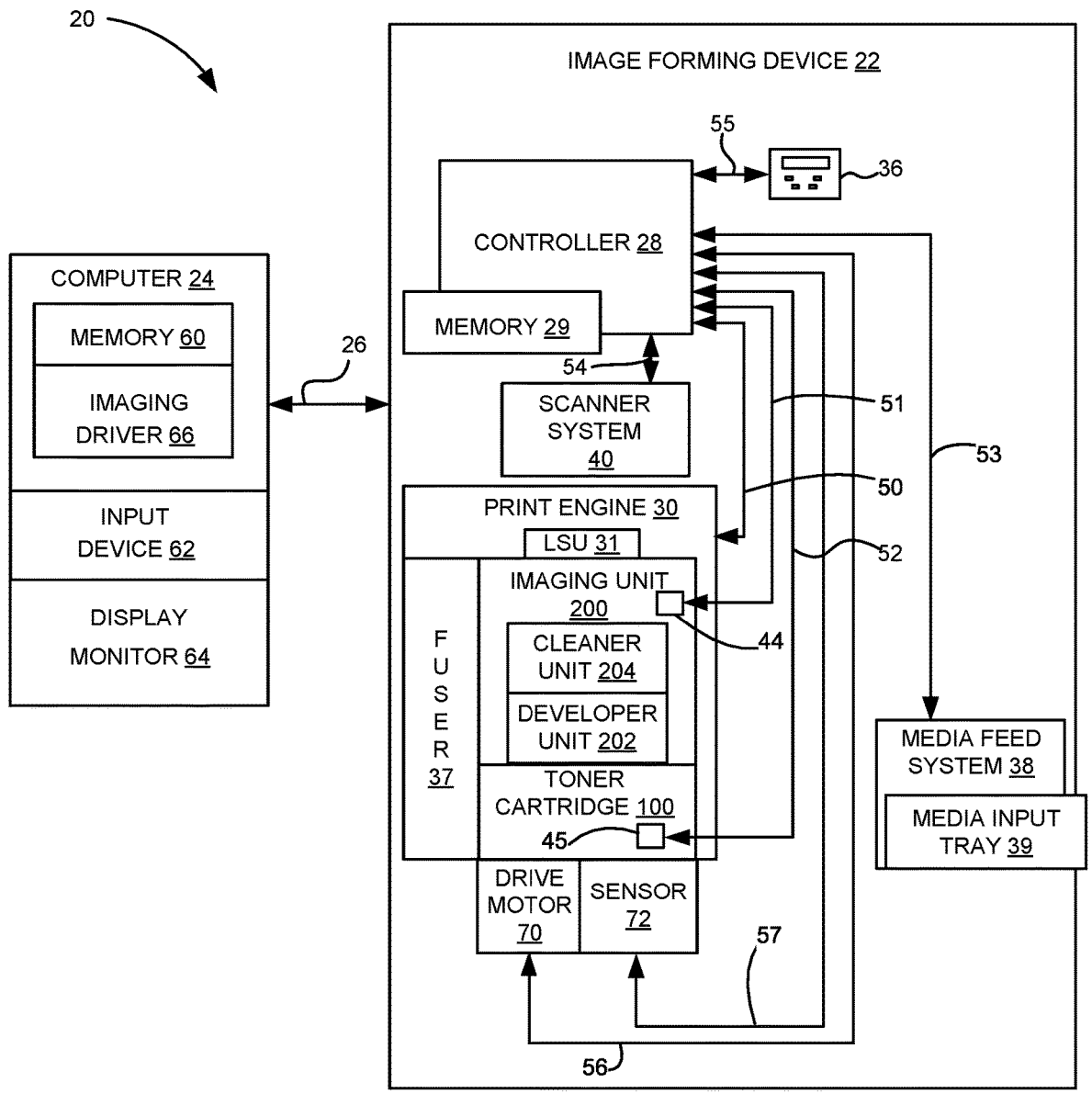
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, an imaging unit 200, a toner cartridge 100, a user interface 36, a media feed system 38, a media input tray 39, a scanner system 40, a drive motor 70 and a sensor 72. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor may include one or more integrated circuits in the form of a microprocessor or central processing unit and may be formed as one or more application-specific integrated circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with imaging unit 200 and processing circuitry 44 thereon via a communications link 51. Controller 28 communicates with toner cartridge 100 and processing circuitry 45 thereon via a communications link 52. Controller 28 communicates with media feed system 38 via a communications link 53. Controller 28 communicates with scanner system 40 via a communications link 54. User interface 36 is communicatively coupled to controller 28 via a communications link 55. Controller 28 communicates with drive motor 70 via a communications link 56. Controller 28 communicates with sensor 72 via a communications link 57. Controller 28 processes print and scan data and operates print engine 30 during printing and scanner system 40 during scanning. Processing circuitry 44, 45 may provide authentication functions, safety and operational interlocks, operating parameters and usage information related to imaging unit 200 and toner cartridge 100, respectively. Each of processing circuitry 44, 45 includes a processor unit and associated electronic memory. As discussed above, the processor may include one or more integrated circuits in the form of a microprocessor or central processing unit and may include one or more application-specific integrated circuits (ASICs). The memory may be any volatile or non-volatile memory or combination thereof or any memory device convenient for use with processing circuitry 44, 45.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes laser scan unit (LSU) 31, toner cartridge 100, imaging unit 200 and a fuser 37, all mounted within image forming device 22. Imaging unit 200 is removably mounted in image forming device 22 and includes a developer unit 202 that houses a toner sump and a toner development system. In one embodiment, the toner development system utilizes what is commonly referred to as a single component development system. In this embodiment, the toner development system includes a toner adder roll that provides toner from the toner sump to a developer roll. A doctor blade provides a metered uniform layer of toner on the surface of the developer roll. In another embodiment, the toner development system utilizes what is commonly referred to as a dual component development system. In this embodiment, toner in the toner sump of developer unit 202 is mixed with magnetic carrier beads. The magnetic carrier beads may be coated with a polymeric film to provide triboelectric properties to attract toner to the carrier beads as the toner and the magnetic carrier beads are mixed in the toner sump. In this embodiment, developer unit 202 includes a magnetic roll that attracts the magnetic carrier beads having toner thereon to the magnetic roll through the use of magnetic fields. Imaging unit 200 also includes a cleaner unit 204 that houses a photoconductive drum and a waste toner removal system.

Toner cartridge 100 is removably mounted in imaging forming device 22 in a mating relationship with developer unit 202 of imaging unit 200. An outlet port on toner cartridge 100 communicates with an inlet port on developer unit 202 allowing toner to be periodically transferred from toner cartridge 100 to resupply the toner sump in developer unit 202.

The electrophotographic printing process is well known in the art and, therefore, is described briefly herein. During a printing operation, laser scan unit 31 creates a latent image on the photoconductive drum in cleaner unit 204. Toner is transferred from the toner sump in developer unit 202 to the latent image on the photoconductive drum by the developer roll (in the case of a single component development system) or by the magnetic roll (in the case of a dual component development system) to create a toned image. The toned image is then transferred to a media sheet received by imaging unit 200 from media input tray 39 for printing. Toner may be transferred directly to the media sheet by the photoconductive drum or by an intermediate transfer member that receives the toner from the photoconductive drum. Toner remnants are removed from the photoconductive drum by the waste toner removal system. The toner image is bonded to the media sheet in fuser 37 and then sent to an output location or to one or more finishing options such as a duplexer, a stapler or a hole-punch.

Figure 2:
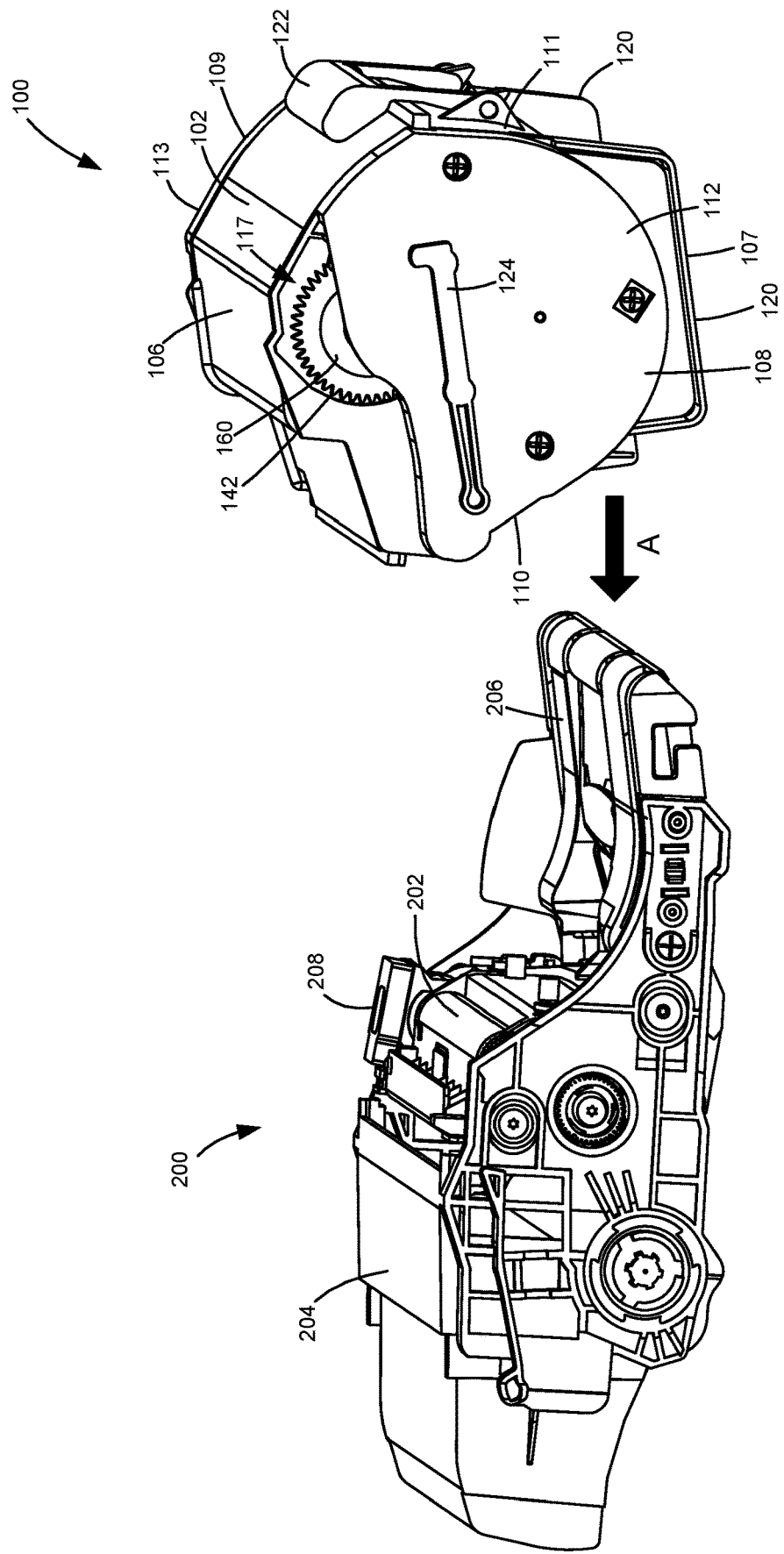
FIG. 2 is a perspective view of a toner cartridge and an imaging unit according to one example embodiment.

Referring now to FIG. 2, toner cartridge 100 and imaging unit 200 are shown according to one example embodiment. Imaging unit 200 includes a developer unit 202 and a cleaner unit 204 mounted on a common frame 206. Developer unit 202 includes a toner inlet port 208 positioned to receive toner from toner cartridge 100. As discussed above, imaging unit 200 and toner cartridge 100 are each removably installed in image forming device 22. Imaging unit 200 is first slidably inserted into image forming device 22. Toner cartridge 100 is then inserted into image forming device 22 and onto frame 206 in a mating relationship with developer unit 202 of imaging unit 200 as indicated by the arrow A shown in FIG. 2, which also indicates the direction of insertion of imaging unit 200 and toner cartridge 100 into image forming device 22. This arrangement allows toner cartridge 100 to be removed and reinserted easily when replacing an empty toner cartridge 100 without having to remove imaging unit 200. Imaging unit 200 may also be readily removed as desired in order to maintain, repair or replace the components associated with developer unit 202, cleaner unit 204 or frame 206 or to clear a media jam.

With reference to FIGS. 2-5, toner cartridge 100 includes a housing 102 having an enclosed reservoir 104 (FIG. 5) for storing toner. Housing 102 includes a top 106, a bottom 107, first and second sides 108, 109, a front 110 and a rear 111. Front 110 of housing 102 leads during insertion of toner cartridge 100 into image forming device 22 and rear 111 trails. In one embodiment, each side 108, 109 of housing 102 includes an end cap 112, 113 mounted, e.g., by fasteners or a snap-fit engagement, to side walls 114, 115 of a main body 116 of housing 102. An outlet port 118 in fluid communication with reservoir 104 is positioned on front 110 of housing 102 near side 109 for exiting toner from toner cartridge 100. Housing 102 may include legs 120 on bottom 107 to assist with the insertion of toner cartridge 100 into image forming device 22 and to support housing 102 when toner cartridge 100 is set on a flat surface. A handle 122 may be provided on top 106 or rear 111 of housing 102 to assist with insertion and removal of toner cartridge 100 into and out of image forming device 22.

Figure 3:
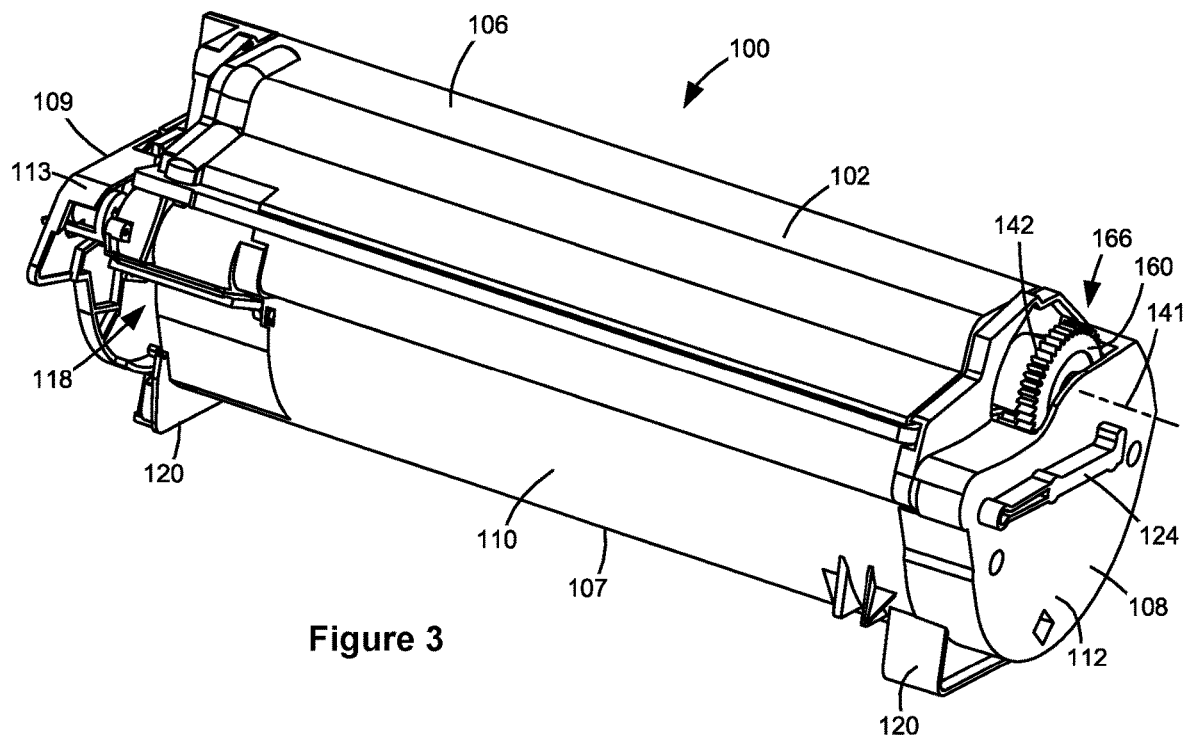
FIG. 3 is a front perspective view of the toner cartridge shown in FIG. 2.
Figure 4:
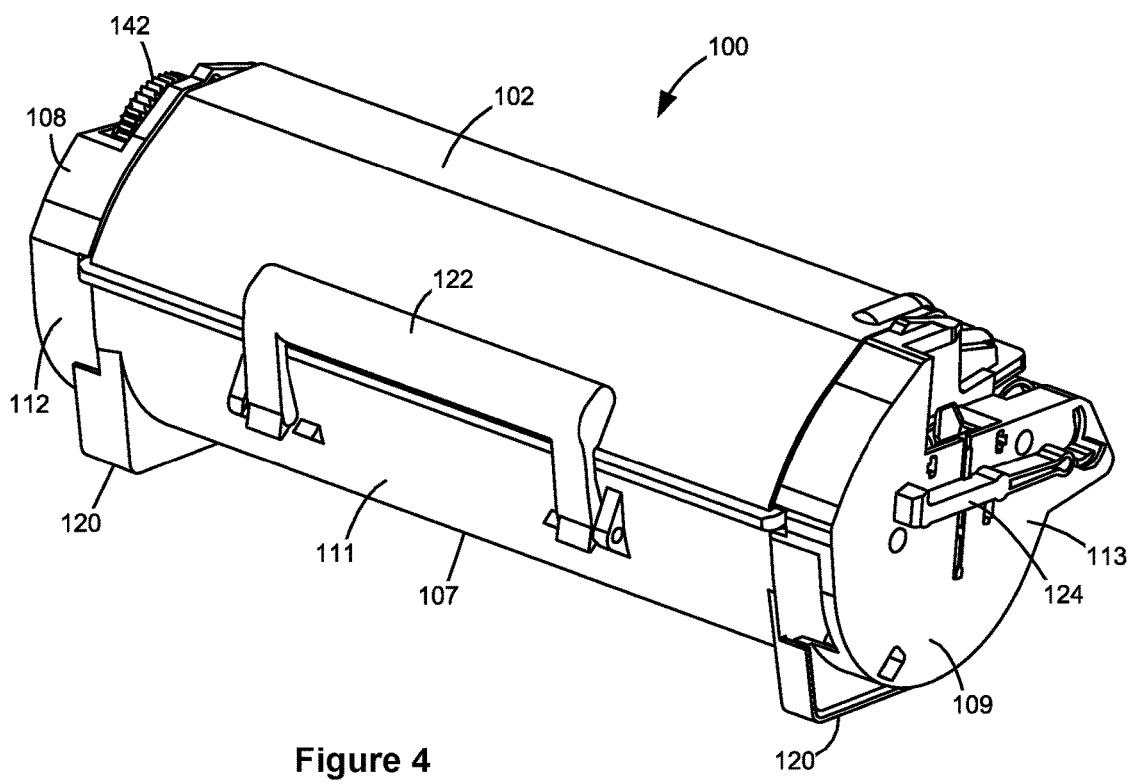
FIG. 4 is a rear perspective view of the toner cartridge shown in FIGS. 2 and 3.

Sides 108, 109 may each include an alignment guide 124 that extends outward from the respective side 108, 109 to assist the insertion of toner cartridge 100 into image forming device 22. Alignment guides 124 travel in corresponding guide slots in image forming device 22 that guide the insertion of toner cartridge 100 into image forming device 22. In the example embodiment illustrated, an alignment guide 124 is positioned on the outer side of each end cap 112, 113. Alignment guides 124 may run along a front-to-rear dimension of housing 102 as shown in FIGS. 2-4.

Figure 5:
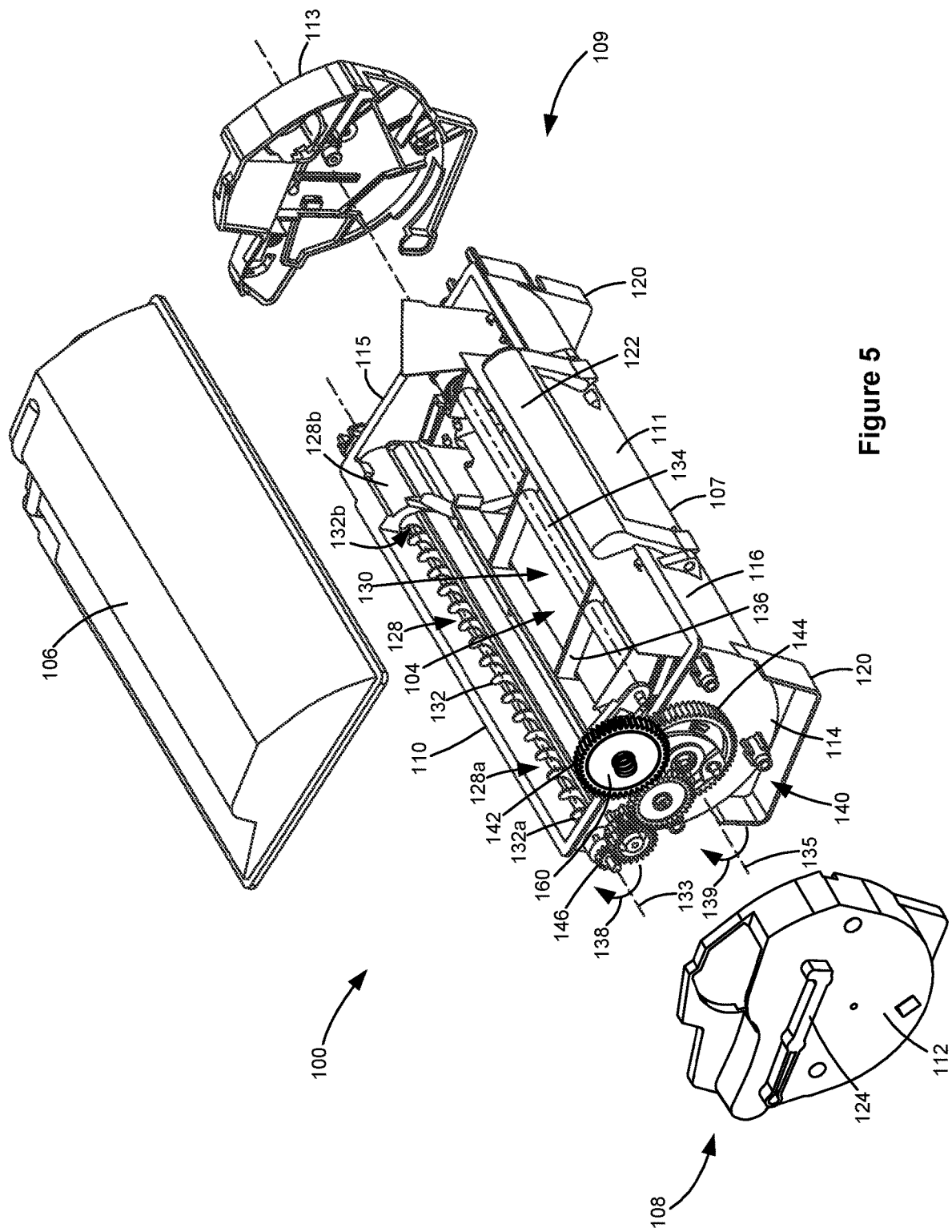
FIG. 5 is an exploded view of the toner cartridge shown in FIGS. 2-4 showing internal components of the toner cartridge and an encoded member according to one example embodiment.

With reference to FIG. 5, in the example embodiment illustrated, a toner agitator assembly 130 is rotatably positioned within toner reservoir 104. Toner agitator assembly 130 includes an auger 132 having first and second ends 132a, 132b and a spiral screw flight. Auger 132 is positioned in a channel 128 that runs along the front 110 of housing 102 from side 108 to side 109. Channel 128 is oriented generally horizontal when toner cartridge 100 is installed in image forming device 22. Auger 132 includes a rotational axis 133. In operation, auger 132 rotates in an operative rotational direction 138. Rotation of auger 132 delivers toner in channel 128 to outlet port 118, which is positioned at the bottom of channel 128 so that gravity assists in exiting toner through outlet port 118. Channel 128 includes an open portion 128a and may include an enclosed portion 128b. Open portion 128a is open to toner reservoir 104 and extends from side 108 toward second end 132b of auger 132. Enclosed portion 128b of channel 128 extends from side 109 and encloses second end 132b of auger 132. In this embodiment, outlet port 118 is positioned at the bottom of enclosed portion 128b of channel 128.

Toner agitator assembly 130 also includes a rotatable drive shaft 134 and one or more toner agitators 136 in the form of extensions outward from drive shaft 134. Drive shaft 134 includes a rotational axis 135. In the example embodiment illustrated, rotational axis 135 of drive shaft 134 is parallel to rotational axis 133 of auger 132. In operation, drive shaft 134 rotates in an operative rotational direction 139. Toner agitators 136 rotate with drive shaft 134 around rotational axis 135 when drive shaft 134 rotates in operative rotational direction 139. As drive shaft 134 rotates, toner agitators 136 agitate and mix the toner stored in toner reservoir 104 and, in the embodiment illustrated, move toner toward channel 128 where auger 132 moves the toner to outlet port 118. In the example embodiment illustrated, first and second ends of drive shaft 134 extend through aligned openings in side walls 114, 115, respectively. However, drive shaft 134 may take other positions and orientations as desired. Bushings may be provided on an inner side of each side wall 114, 115 where drive shaft 134 passes through side walls 114, 115.

A drive train 140 on housing 102 is operatively connected to auger 132 and drive shaft 134 and may be positioned within a space formed between end cap 112 and side wall 114. Drive train 140 includes an input gear 142 that engages with a corresponding output gear in image forming device 22 that provides rotational motion from drive motor 70 in image forming device 22 to input gear 142. As shown in FIG. 3, in one embodiment, a front portion of input gear 142 is exposed at the front 110 of housing 102 near the top 106 of housing 102 where input gear 142 engages the output gear in image forming device 22. With reference back to FIG. 5, in the embodiment illustrated, drive train 140 also includes a drive gear 144 on one end of drive shaft 134 that is connected to input gear 142 either directly or via one or more intermediate gears to rotate drive shaft 134. In the embodiment illustrated, drive train 140 also includes a drive gear 146 on first end 132a of auger 132 that is connected to input gear 142 either directly or via one or more intermediate gears to rotate auger 132.

Figure 6:
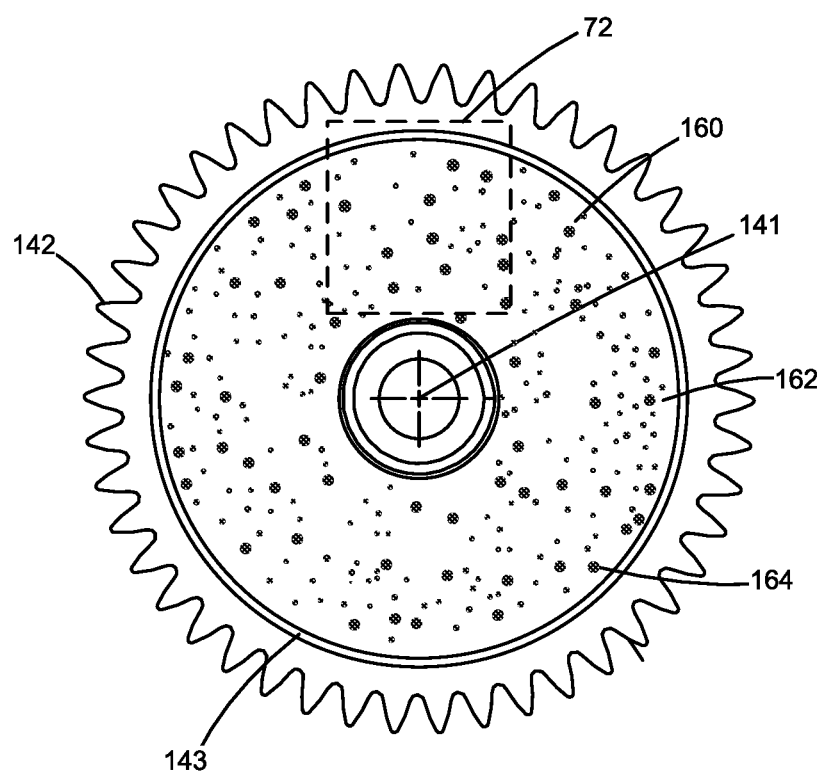
FIG. 6 is a side elevation view of the encoded member of the toner cartridge according to one example embodiment.
Figure 7:
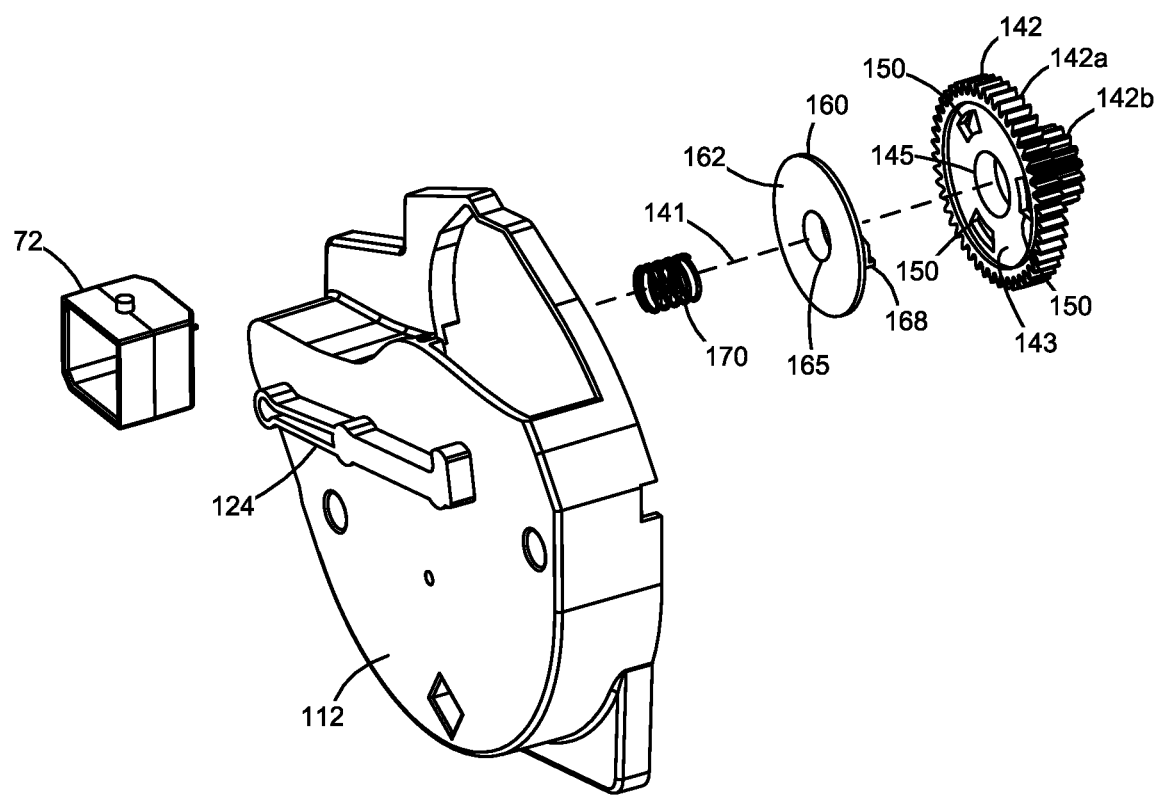
FIG. 7 is an outer side exploded view showing the encoded member relative to an input gear of the toner cartridge and a sensor of the image forming device according to one example embodiment.
Figure 8:
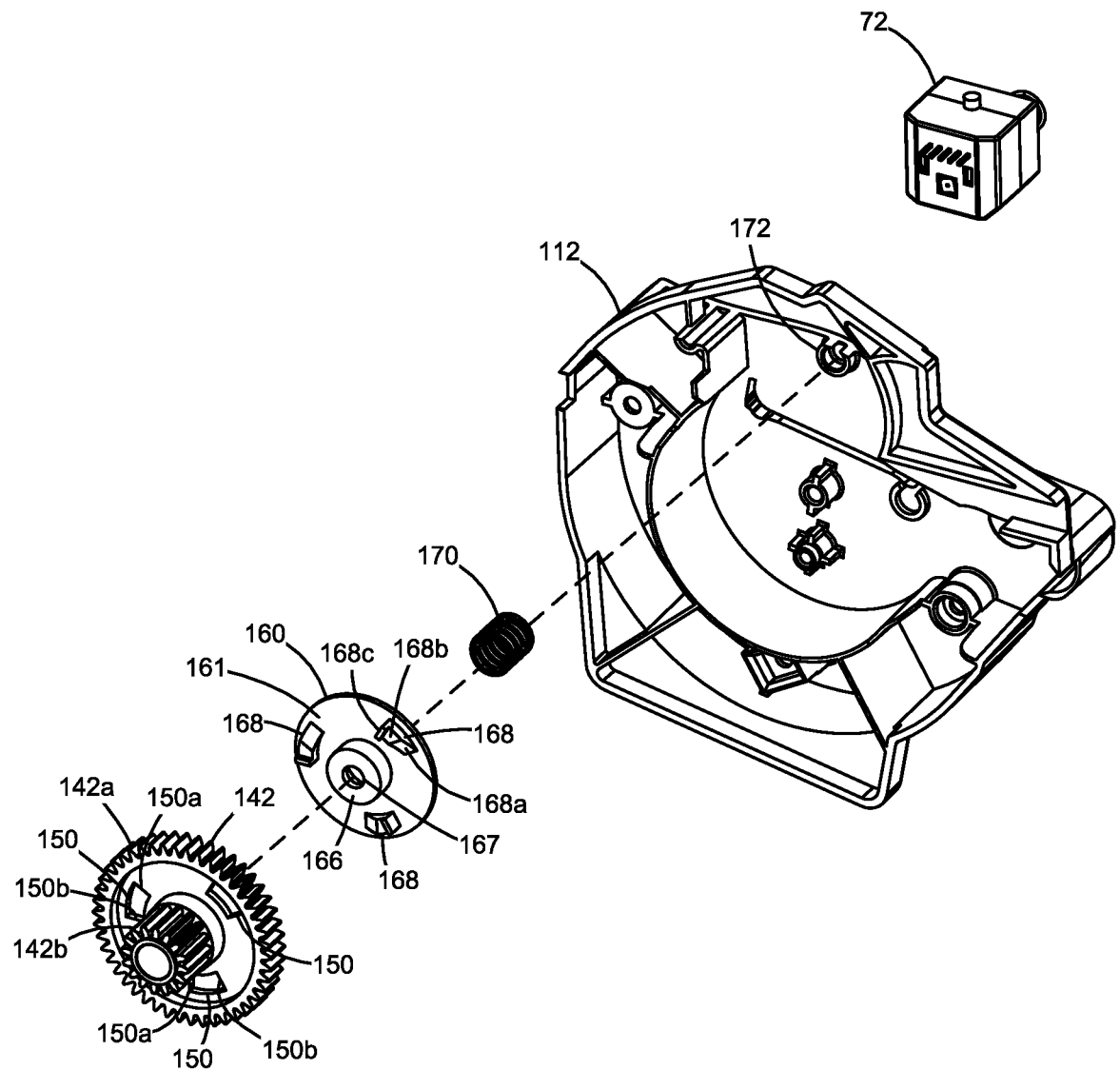
FIG. 8 is an inner side exploded view of the encoded member relative to the input gear of the toner cartridge and the sensor of the image forming device according to one example embodiment.

With reference to FIGS. 5 and 6, toner cartridge 100 includes an encoded member 160 that is movably connected to drive train 140, either directly or indirectly to input gear 142. In the example embodiment illustrated, encoded member 160 includes a rotatable disk 162 operatively connected to drive train 140, such as, for example, positioned on an outboard face 143 of input gear 142, coaxially with input gear 142 as illustrated. Disk 162 may be formed integrally with input gear 142 or separately attached to input gear 142. Information pertaining to toner cartridge 100 is encoded on encoded member 160. Encoded member 160 is detectable by sensor 72 in image forming device 22 when toner cartridge 100 is installed in image forming device 22 permitting sensor 72 to communicate the encoded information of toner cartridge 100 to controller 28 of image forming device 22 via communications link 57. The encoded information may include, for example, authentication information such as a signature, serial number, or other identifier for authenticating or validating toner cartridge 100 upon installation of toner cartridge 100 in image forming device 22. The encoded information may include, for example, characteristics of toner cartridge 100 such as toner color, initial toner fill amount, toner type, geographic region, manufacture location, manufacture date, etc.

In the example embodiment illustrated, authentication information is encoded on encoded member 160 by randomly distributed magnetized particles 164 dispersed on disk 162, e.g., on the surface of disk 162 and/or within disk 162. Particles 164 are distributed randomly such that it is difficult to reproduce the exact distribution and alignment of particles 164 thereby making the distribution difficult to copy. In this embodiment, sensor 72 is positioned in close proximity to encoded member 160 when toner cartridge 100 is installed in image forming device 22, such as adjacent to and facing the outboard side of disk 162 as schematically illustrated in FIG. 6. At predetermined times, such as upon the installation of a new toner cartridge in image forming device 22, sensor 72 measures the magnetic field of disk 162 in one, two or three dimensions as disk 162 rotates due to rotation of input gear 142 by motor 70. The magnetic field values measured by sensor 72 are communicated to controller 28 via communications link 57. Controller 28 may then compare the magnetic field values received from sensor 72 to values stored during manufacture in non-volatile memory of processing circuitry 45 of toner cartridge 100. Controller 28 may confirm the authenticity of toner cartridge 100 to controller 28 if the magnetic field values received from sensor 72 match the values stored in non-volatile memory of processing circuitry 45.

While the example embodiment illustrated includes information encoded by a random distribution of magnetized particles and detection by measuring the magnetic field of the particles, it will be appreciated that information may be encoded by a random distribution of non-magnetized particles and detection may occur according to other means, such as, for example, by measuring an optical property of the particles. Further, in lieu of a random pattern, information may be encoded according to a predetermined pattern using any suitable indicia and detection method. However, as discussed above, it is preferred for authentication information to be encoded according to a random pattern so that the encoded information is more difficult for a counterfeiter to reproduce.

With reference back to FIGS. 2 and 3, in the example embodiment illustrated, at least a portion of encoded member 160 is exposed on the exterior of toner cartridge 100, e.g., above a rotational axis 141 of input gear 142, for reading by sensor 72. For example, in the embodiment illustrated, encoded member 160 is exposed through a cutout 166 in end cap 112 that is positioned above rotational axis 141 of input gear 142.

In one example embodiment, encoded member 160 is mounted on side 108 of toner cartridge 100 such that encoded member 160 is movable towards or away from sensor 72 in image forming device 22. In one embodiment, encoded member 160 is operatively connected to input gear 142 such that encoded member 160 translates toward sensor 72 when input gear 142 rotates in a first rotational direction, and encoded member 160 translates away from sensor 72 when input gear 142 rotates in a second rotational direction opposite the first rotational direction. Moving encoded member 160 towards sensor 72 allows encoded member 160 to be positioned closer to and/or engage sensor 72, such as when sensor 72 is controlled to read encoded information of toner cartridge 100 from encoded member 160. Moving encoded member 160 away from sensor 72 allows encoded member 160 to disengage from sensor 72 during operations where communication of encoded information of toner cartridge 100 to controller 28 of image forming device 22 may not be required, such as during a normal printing operation where input gear 142 is used to drive at least one component of toner cartridge 100 to rotate in the operative rotational direction. Accordingly, the translatable configuration of encoded member 160 allows encoded member 160 to engage sensor 72 only when desired in order to reduce the amount of time sensor 72 and encoded member 160 are in contact with each other over the lifecycle of image forming device 22, and consequently reduce wear of sensor 72 and/or encoded member 160. In other embodiments, encoded member 160 may be moved to engage sensor 72 and operated at lower rotational speeds (relative to normal printing operations) during a read cycle of encoded member 160 by sensor 72 to further reduce wear of sensor 72 and encoded member 160.

Figure 9A:
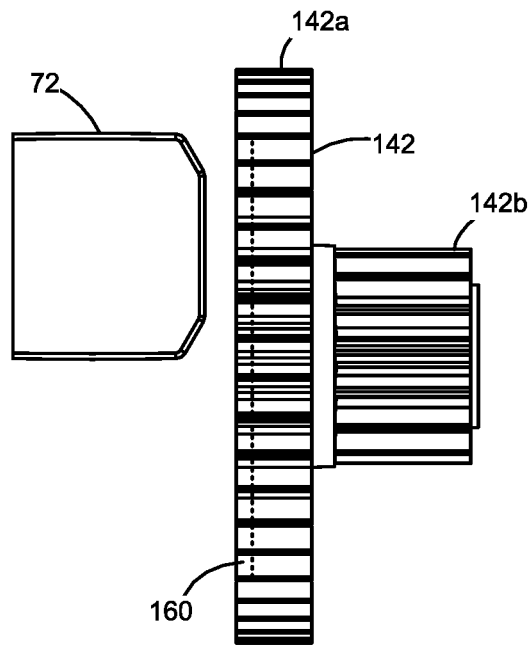
FIGS. 9A and 9B are elevation views showing the encoded member in a retracted position and in an extended position, respectively, relative to the sensor of the image forming device according to one example embodiment.
Figure 9B:
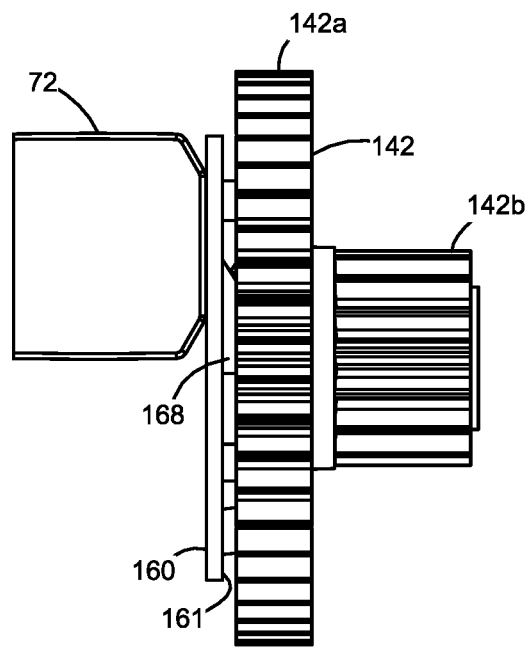

With reference to FIGS. 7-9B, encoded member 160 is axially movable along rotational axis 141 of input gear 142 according to one example embodiment. In the embodiment illustrated, encoded member 160 is movably coupled to input gear 142 such that encoded member 160 is movable relative to input gear 142 between a retracted position (FIG. 9A) and an extended position (FIG. 9B). In the retracted position, encoded member 160 is axially positioned inward into input gear 142 such that an inboard face 161 of encoded member 160 is positioned proximate to outboard face 143 of input gear 142, such as in contact with outboard face 143 of input gear 142. In the extended position, encoded member 160 is axially positioned outward away from input gear 142 such that inboard face 161 of encoded member 160 is extended and spaced away from outboard face 143 of input gear 142. In the embodiment illustrated, input gear 142 is shown as a compound gear having a larger diameter gear 142a that is connected to drive gear 146 via a plurality of intermediate gears to rotate auger 132, and a smaller diameter gear 142b that is connected to drive gear 144 to rotate toner agitator assembly 130. However, in other embodiments, input gear 142 may be any suitable type of gear as desired.

In the embodiment illustrated, rotatable disk 162 of encoded member 160 is biased against outboard face 143 of input gear 142 by a bias spring 170 positioned between end cap 112 and encoded member 160. In this embodiment, rotatable disk 162 of encoded member 160 includes a collar 166 extending axially inward relative to input gear 142 on inboard face 161 of encoded member 160. Input gear 142 has a center opening 145 that is sized to mateably receive collar 166 of encoded member 160 for locating encoded member 160 relative to input gear 142. In the embodiment illustrated, a boss 172 protrudes inward from end cap 112 along an axial dimension of input gear 142. Collar 166 defines a cavity 165 that is sized to receive boss 172 and spring 170 such that boss 172 locates spring 170 relative to encoded member 160 and input gear 142. In the example embodiment illustrated, boss 172 also locates input gear 142 relative to end cap 112 and to the rest of drive train 140.

In the example embodiment illustrated, rotatable disk 162 of encoded member 160 includes one or more engagement members 168 that protrude axially from inboard face 161 of rotatable disk 162 toward outboard face 143 of input gear 142. Each engagement member 168 includes a ramp 168a and a dwell 168b which together form a cam surface on inboard face 161 of rotatable disk 162 that tapers axially inward (toward inboard face 161 of rotatable disk 162) away from a corresponding dwell 168b of engagement member 168 along a circumferential dimension of rotatable disk 162. Each engagement member 168 includes a ledge 168c positioned to receive rotational motion from input gear 142 when input gear 142 rotates, as will be discussed below. In the embodiment illustrated, ledge 168c is positioned perpendicular to inboard face 161 of rotatable disk 162.

In the embodiment illustrated, input gear 142 includes one or more openings 150 positioned to receive a corresponding engagement member 168 of encoded member 160. Each opening 150 of input gear 142 is positioned to limit the rotational motion of encoded member 160 relative to input gear 142. In the embodiment illustrated, each opening 150 includes a first contact edge 150a and a second contact edge 150b for engaging a corresponding ledge 168c of engagement member 168. Encoded member 160 is rotatable relative to input gear 142 when ledge 168c of engagement member 168 is free from contact with first and second contact edges 150a, 150b of opening 150. When ledge 168c of a corresponding engagement member 168 of encoded member 160 is in contact with one of the first and second contact edges 150a, 150b of a corresponding opening 150 of input gear 142, rotation of input gear 142 transfers rotational motion from input gear 142 to encoded member 160. Specifically, with first contact edge 150a of a corresponding opening 150 of input gear 142 engaged with ledge 168c of a corresponding engagement member 168 of encoded member 160, rotation of input gear 142 in the counterclockwise direction, as viewed in FIG. 8, causes encoded member 160 to rotate with input gear 142 in the counterclockwise direction. On the other hand, with second contact edge 150b of a corresponding opening 150 of input gear 142 engaged with ledge 168c of a corresponding engagement member 168 of encoded member 160, rotation of input gear 142 in the clockwise direction, as viewed in FIG. 8, causes encoded member 160 to rotate with input gear 142 in the clockwise direction.

FIGS. 10A-10D are sequential views illustrating the interaction between encoded member 160 and input gear 142. In the example shown, input gear 142 includes a cutaway to expose opening 150 of input gear 142 and engagement member 168 of encoded member 160 for purposes of illustration.

Figure 10A:
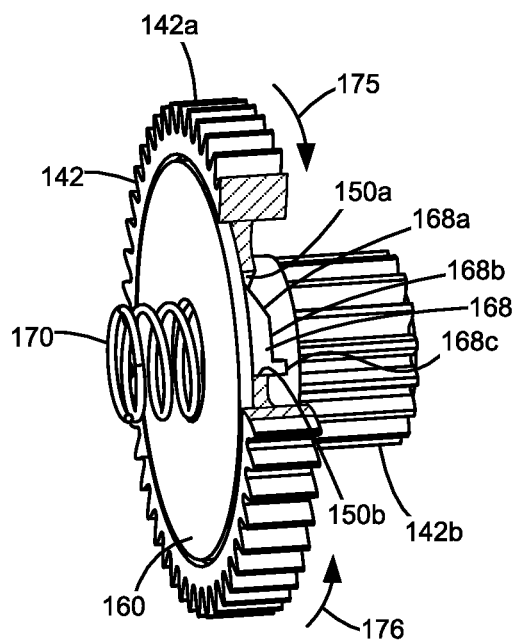
FIGS. 10A-10D are perspective views showing various positions of the encoded member relative to the input gear according to one example embodiment.

FIG. 10A illustrates encoded member 160 in the retracted position relative to input gear 142. In the retracted position, engagement member 168 of encoded member 160 is disposed within opening 150 of input gear 142 with ledge 168c of engagement member 168 of encoded member 160 positioned against second contact edge 150b of opening 150 of input gear 142.

Figure 10B:
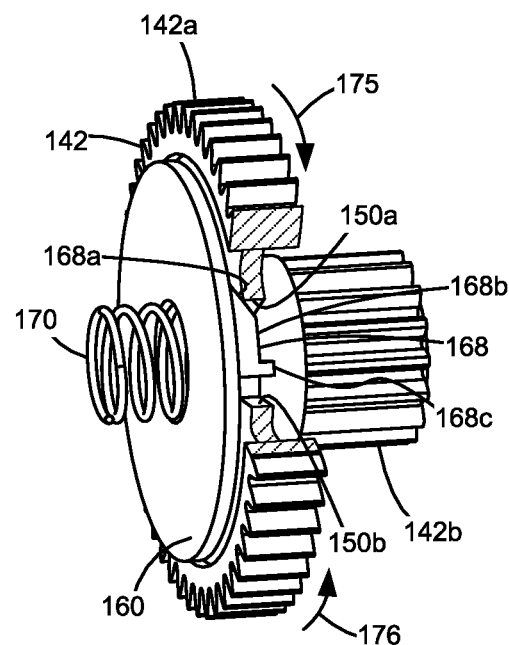

When input gear 142 rotates in rotational direction 175 as shown in FIG. 10B, input gear 142 may rotate without rotating encoded member 160 therewith allowing ledge 168c of engagement member 168 of encoded member 160 to disengage from second contact edge 150b of opening 150 of input gear 142. Due to the biasing force provided by spring 170 on encoded member 160, engagement member 168 of encoded member 160 is continuously biased against first contact edge 150a of opening 150 of input gear 142 as input gear 142 rotates in rotational direction 175 causing first contact edge 150a of opening 150 of input gear 142 to slide against ramp 168a of engagement member 168 of encoded member 160 as shown in FIG. 10B, moving encoded member 160 axially away from input gear 142 against the biasing force of spring 170 until first contact edge 150a of opening 150 of input gear 142 reaches dwell 168b of engagement member 168 of encoded member 160 as shown in FIG. 10C.

Figure 10C:
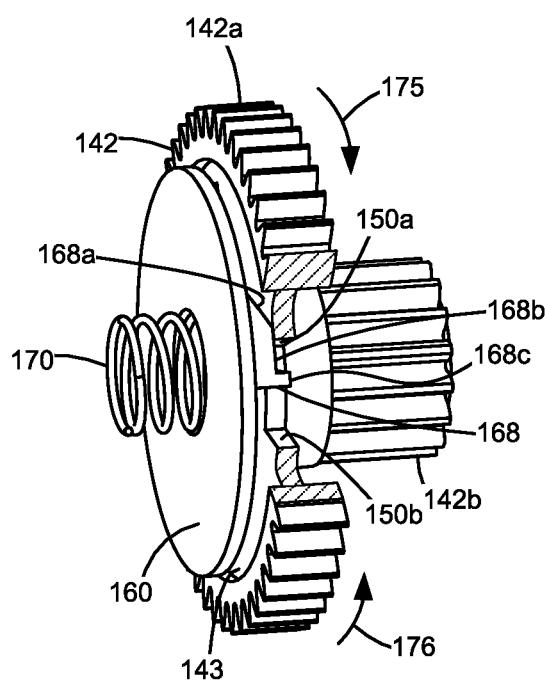
Figure 10D:
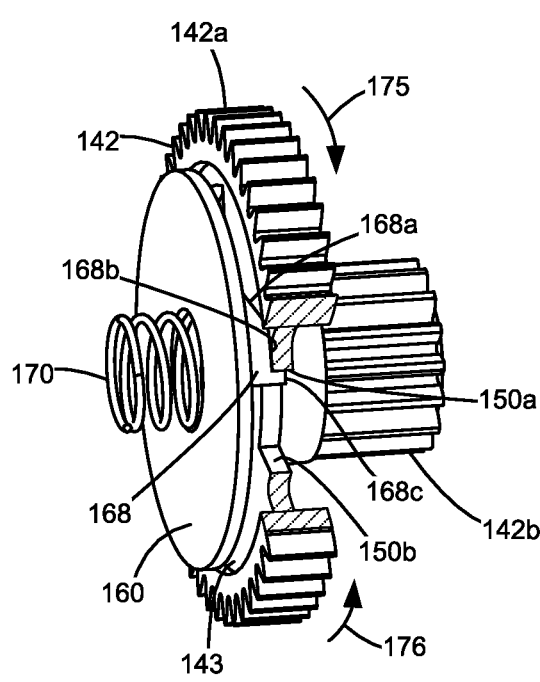

In FIG. 10C, encoded member 160 is in the extended position relative to input gear 142. As input gear 142 further rotates in rotational direction 175, encoded member 160 remains in the extended position while outboard face 143 of input gear 142 slides along dwell 168b of engagement member 168 of encoded member 160 until first contact edge 150a of opening 150 of input gear 142 reaches ledge 168c of engagement member 168 of encoded member 160 as shown in FIG. 10D. When first contact edge 150a of opening 150 of input gear 142 engages ledge 168c of engagement member 168 of encoded member 160, further rotation of input gear 142 in rotational direction 175 causes encoded member 160 to rotate with input gear 142 in rotational direction 175 while encoded member 160 is in the extended position. In this manner, when input gear 142 rotates in rotational direction 175, encoded member 160 rotates with input gear 142 for sensing by sensor 72.

When input gear 142 rotates in rotational direction 176 opposite rotational direction 175, encoded member 160 moves from the extended position to the retracted position. As input gear 142 rotates in rotational direction 176 from the extended position shown in FIG. 10D, encoded member 160 substantially does not rotate with input gear 142 and initially remains in the extended position as shown in FIG. 10C. Specifically, as input gear 142 rotates in rotational direction 176, outboard face 143 of input gear 142 slides along dwell 168b of engagement member 168 of encoded member 160 causing first contact edge 150a of opening 150 of input gear 142 to disengage from ledge 168c of engagement member 168 of encoded member 160 until first contact edge 150a of opening 150 of input gear 142 reaches ramp 168a of engagement member 168 of encoded member 160 as shown in FIG. 10B. As input gear 142 continues to rotate in rotational direction 176, contact between first contact edge 150a of opening 150 and ramp 168a of engagement member 168 due to the bias applied to encoded member 160 by spring 170 causes encoded member 160 to translate axially toward input gear 142 until encoded member 160 reaches the retracted position where second contact edge 150b of opening 150 of input gear 142 engages with ledge 168c of engagement member 168 of encoded member 160 as shown in FIG. 10A. With second contact edge 150b of opening 150 of input gear 142 engaged with ledge 168c of engagement member 168 of encoded member 160, further rotation of input gear 142 in rotational direction 176 causes encoded member 160 to rotate with input gear 142 in rotational direction 176 while encoded member 160 is in the retracted position. In this manner, when input gear 142 rotates in rotational direction 176, encoded member 160 rotates with input gear 142 but is positioned away and disengaged from sensor 72 in image forming device 22.

In one example, in the embodiment illustrated, input gear 142 is rotated in rotational direction 175 to perform a reading of encoded member 160 by sensor 72 such as when an authentication function is performed, and input gear 142 is rotated in rotational direction 176 to feed toner from toner cartridge 100 to developer unit 202. In this manner, a toner feed operation is performed while encoded member 160 is positioned away from sensor 72, and a reading operation of encoded member 160 is performed separately from the toner feed operation while encoded member 160 is positioned closer to and/or is engaged with sensor 72.

Figure 11:
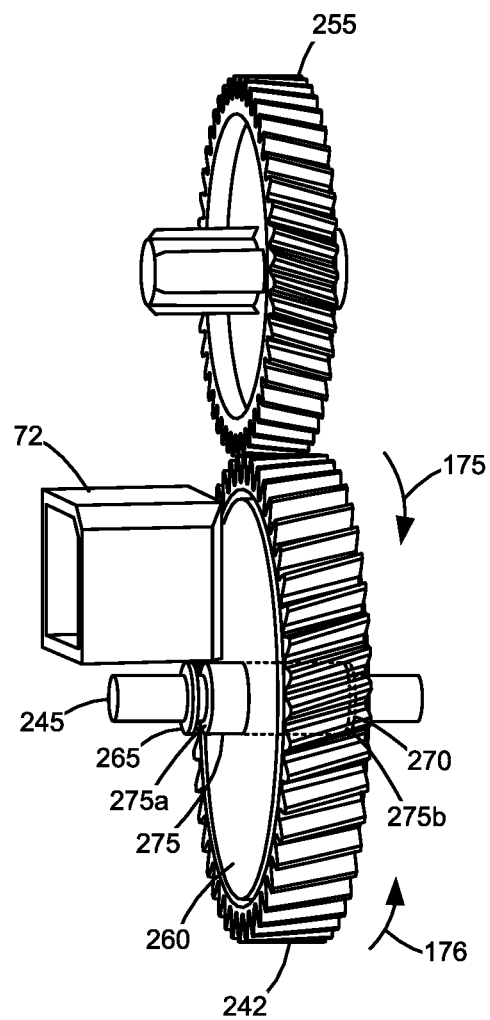
FIG. 11 is a perspective view of a retractable encoded member according to another example embodiment.

While the example embodiments illustrated include an encoded member 160 that is movably connected to an input gear of toner cartridge 100, information may be encoded on an encoded member that is axially movable along a side of toner cartridge 100 according to many other suitable methods. For example, in the embodiment illustrated in FIG. 11, an encoded member 260 is molded to a gear 242 that is translatable along a shaft 245 to move toward or away from sensor 72 in image forming device 22. In the embodiment illustrated, gear 242 is a helical gear that meshes with a helical drive gear 255. In this embodiment, when helical drive gear 255 drives gear 242 to rotate in rotational direction 176, gear 242 and encoded member 260 move along shaft 245 towards sensor 72 due to the separation force between helical drive gear 255 and gear 242. Conversely, when helical drive gear 255 drives gear 242 to rotate in rotational direction 175, the separation force between helical drive gear 255 and gear 242 causes gear 242 and encoded member 260 to move along shaft 245 away from sensor 72. Axial movement of gear 242 may be constrained using stops positioned along shaft 245. In the embodiment illustrated, an outboard retaining ring 265 and an inboard retaining ring 270 are positioned along shaft 245 at opposite faces of gear 242. Gear 242 includes a collar 275 having an outboard end 275a that contacts outboard retaining ring 265 to limit axial movement of gear 242 towards sensor 72, and an inboard end 275b that contacts inboard retaining ring 270 to limit axial movement of gear 242 away from sensor 72. In this embodiment, encoded member 260 is in an engaged position relative to sensor 72 when outboard end 275a of collar 275 is in contact with outboard retaining ring 265, and encoded member 260 is in a disengaged position relative to sensor 72 when inboard end 275b of collar 275 is in contact with inboard retaining ring 270. Wear washers may be used against opposite ends of collar 275 to reduce wear. In other embodiments, shoulders may be used on shaft 245, and/or features of the drive assembly may be used to contact collar 275 of gear 242 to limit axial movement.

In another example, in the embodiment illustrated in FIGS. 12A and 12B, an encoded member 360 is molded to a gear 342 that is translatable along a shaft 345. Gear 342 and encoded member 360 are continuously biased, such as by using a compression spring, towards a collar 375 fixedly mounted on shaft 345. Collar 375 includes a disk 380 having one or more engagement members 385 that protrude axially from outboard face 381 of disk 380 toward gear 342. Engagement member 385 includes a ramp 385a and a dwell 385b, which together form a cam surface on outboard face 381 of disk 380, and a ledge 385c. Engagement member 385 is positioned to engage a corresponding opening 370 on gear 342. With a first contact edge 370a of opening 370 of gear 342 engaged with ledge 385c of engagement member 385 of disk 380, rotation of gear 342 in rotational direction 176 causes disk 380 to rotate with gear 342 in rotational direction 176 while encoded member 360 is in a retracted position relative to disk 380 as shown in FIG. 12A. When gear 342 rotates in rotational direction 175, a second contact edge 370b of opening 370 of gear 342 slides along ramp 385a and dwell 385b until second contact edge 370b engages ledge 385c of engagement member 385 of disk 380 as shown in FIG. 12B, thereby moving gear 342 and encoded member 360 from the retracted position to an extended position relative to disk 380. With second contact edge 370b of opening 370 of gear 342 engaged with ledge 385c of engagement member 385 of disk 380, rotation of gear 342 in rotational direction 175 causes disk 380 to rotate with gear 342 in rotational direction 175 while keeping encoded member 360 in the extended position to allow reading of encoded member 360.

In other embodiments, an encoded member may be incorporated into a molded ring that extends from a rotating feature on toner cartridge 100, such as a special holder, and the holder may be translatable by way of a helical gear arrangement, a rack and pinion arrangement, or a cam and follower arrangement to achieve engagement and disengagement relative of the encoded member to the sensor in image forming device 22.

While the example embodiment shown in FIG. 2 includes a pair of replaceable units in the form of toner cartridge 100 and imaging unit 200, it will be appreciated that the replaceable unit(s) of image forming device 22 may employ any suitable configuration as desired. For example, in one embodiment, the main toner supply for image forming device 22, developer unit 202 and cleaner unit 204 are housed in one replaceable unit. In another embodiment, the main toner supply for image forming device 22 and developer unit 202 are provided in a first replaceable unit and cleaner unit 204 is provided in a second replaceable unit. Further, while the example image forming device 22 discussed above includes one toner cartridge 100 and corresponding imaging unit 200, in the case of an image forming device configured to print in color, separate replaceable units may be used for each toner color needed. For example, in one embodiment, the image forming device includes four toner cartridges and four corresponding imaging units, each toner cartridge containing a particular toner color (e.g., black, cyan, yellow or magenta) and each imaging unit corresponding with one of the toner cartridges to permit color printing. Further, while the example embodiments illustrated pertain to an encoded member 160 of a toner cartridge 100, it will be appreciated that they may apply to an encoded member of any replaceable unit including, for example, a developer unit, an imaging unit, a waste toner container, a fuser, or an intermediate transfer member.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A replaceable unit for use in an electrophotographic image forming device, comprising:
a housing;
a rotatable gear positioned on the housing of the replaceable unit; and
an encoded member encoded with identifying information of the replaceable unit and positioned on an axially outboard face of the gear such that the encoded member is rotatable with the gear for communicating the identifying information of the replaceable unit to a sensor of the image forming device when the replaceable unit is installed in the image forming device, the encoded member is configured to move axially outward relative to a rotational axis of the gear upon rotation of the gear in a first rotational direction for communicating the identifying information of the replaceable unit to the sensor of the image forming device, the encoded member is configured to move axially inward relative to the rotational axis of the gear upon rotation of the gear in a second rotational direction opposite the first rotational direction.

2. The replaceable unit of claim 1, wherein the encoded member is configured to engage the sensor of the image forming device and rotate with the gear when the gear rotates in the first rotational direction for communicating the identifying information of the replaceable unit to the sensor of the image forming device.

3. The replaceable unit of claim 1, wherein the encoded member is configured to disengage from the sensor of the image forming device and rotate with the gear when the gear rotates in the second rotational direction.

4. The replaceable unit of claim 1, further comprising a reservoir for storing toner and an outlet in fluid communication with the reservoir for exiting toner from the replaceable unit, wherein the replaceable unit is configured to move toner to the outlet when the gear rotates in the second rotational direction.

5. The replaceable unit of claim 1, wherein the encoded member is spring-biased axially inward relative to the rotational axis of the gear.

6. The replaceable unit of claim 1, wherein the encoded member is configured to move axially outward away from the gear upon rotation of the gear in the first rotational direction, and the encoded member is configured to move axially inward toward the gear upon rotation of the gear in the second rotational direction.

7. The replaceable unit of claim 1, wherein the gear is configured to move axially outward upon rotation of the gear in the first rotational direction, and the gear is configured to move axially inward upon rotation of the gear in the second rotational direction.

8. A replaceable unit for use in an electrophotographic image forming device, comprising:
a housing;
a rotatable gear positioned on the housing of the replaceable unit; and
an encoded member encoded with identifying information of the replaceable unit and operatively connected to the gear such that rotation of the gear causes movement of the encoded member for communicating the identifying information of the replaceable unit to a sensor of the image forming device when the replaceable unit is installed in the image forming device, the encoded member is configured to move toward the sensor of the image forming device when the replaceable unit is installed in the image forming device upon rotation of the gear in a first rotational direction for communicating the identifying information of the replaceable unit to the sensor of the image forming device, the encoded member is configured to move away from the sensor of the image forming device when the replaceable unit is installed in the image forming device upon rotation of the gear in a second rotational direction opposite the first rotational direction.

9. The replaceable unit of claim 8, wherein the encoded member is movable along a rotational axis of the gear.

10. The replaceable unit of claim 8, wherein the encoded member is configured to engage the sensor of the image forming device and rotate with the gear when the gear rotates in the first rotational direction for communicating the identifying information of the replaceable unit to the sensor of the image forming device.

11. The replaceable unit of claim 8, wherein the encoded member is configured to disengage from the sensor of the image forming device and rotate with the gear when the gear rotates in the second rotational direction.

12. The replaceable unit of claim 8, further comprising a reservoir for storing toner and an outlet in fluid communication with the reservoir for exiting toner from the replaceable unit, wherein the replaceable unit is configured to move toner to the outlet when the gear rotates in the second rotational direction.

13. The replaceable unit of claim 8, wherein the encoded member is configured to move away from the gear upon rotation of the gear in the first rotational direction, and the encoded member is configured to move toward the gear upon rotation of the gear in the second rotational direction.

14. The replaceable unit of claim 8, wherein the gear is configured to move toward the sensor of the image forming device when the replaceable unit is installed in the image forming device upon rotation of the gear in the first rotational direction, and the gear is configured to move away from the sensor of the image forming device when the replaceable unit is installed in the image forming device upon rotation of the gear in the second rotational direction.

15. A replaceable unit for use in an electrophotographic image forming device, comprising:
   a housing;
   a rotatable gear positioned on the housing of the replaceable unit; and
   an encoded member encoded with identifying information of the replaceable unit and positioned on an axially outboard face of the gear such that the encoded member is rotatable with the gear for communicating the identifying information of the replaceable unit to a sensor of the image forming device when the replaceable unit is installed in the image forming device, the encoded member is movable relative to the gear along an axial direction of the gear between a retracted position and an extended position, rotation of the gear in a first rotational direction causes the encoded member to move from the retracted position to the extended position, rotation of the gear in a second rotational direction opposite the first rotational direction causes the encoded member to move from the extended position to the retracted position.

16. The replaceable unit of claim 15, wherein the encoded member is configured to engage the sensor of the image forming device and rotate with the gear when the gear rotates in the first rotational direction for communicating the identifying information of the replaceable unit to the sensor of the image forming device.

17. The replaceable unit of claim 15, wherein the encoded member is configured to disengage from the sensor of the image forming device and rotate with the gear when the gear rotates in the second rotational direction.

18. The replaceable unit of claim 15, further comprising a reservoir for storing toner and an outlet in fluid communication with the reservoir for exiting toner from the replaceable unit, wherein the replaceable unit is configured to move toner to the outlet when the gear rotates in the second rotational direction.

19. A replaceable unit for use in an electrophotographic image forming device, comprising:
   a housing;
   a rotatable gear positioned on the housing of the replaceable unit; and
   an encoded member encoded with identifying information of the replaceable unit and positioned on an axially outboard face of the gear such that the encoded member is rotatable with the gear for communicating the identifying information of the replaceable unit to a sensor of the image forming device when the replaceable unit is installed in the image forming device, the gear is axially movable along a rotational axis of the gear relative to the housing, rotation of the gear in a first rotational direction causes the gear to move axially outward to move the encoded member toward the sensor of the image forming device when the replaceable unit is installed in the image forming device for communicating the identifying information of the replaceable unit to the sensor of the image forming device, rotation of the gear in a second rotational direction opposite the first rotational direction causes the gear to move axially inward to move the encoded member away from the sensor of the image forming device when the replaceable unit is installed in the image forming device.

20. The replaceable unit of claim 19, wherein the encoded member is molded to the axially outboard face of the gear.

21. The replaceable unit of claim 19, wherein the encoded member and the gear are spring-biased axially inward away from the sensor of the image forming device.

22. The replaceable unit of claim 19, wherein the encoded member is configured to engage the sensor of the image forming device and rotate with the gear when the gear rotates in the first rotational direction for communicating the identifying information of the replaceable unit to the sensor of the image forming device.

23. The replaceable unit of claim 19, wherein the encoded member is configured to disengage from the sensor of the image forming device and rotate with the gear when the gear rotates in the second rotational direction.

24. The replaceable unit of claim 19, further comprising a reservoir for storing toner and an outlet in fluid communication with the reservoir for exiting toner from the replaceable unit, wherein the replaceable unit is configured to move toner to the outlet when the gear rotates in the second rotational direction.

* * * * *